(12) United States Patent
Wills

(10) Patent No.: US 9,901,029 B2
(45) Date of Patent: Feb. 27, 2018

(54) MOWER BLADE ASSEMBLY

(71) Applicant: Bryan A Wills, New Washington, IN (US)

(72) Inventor: Bryan A Wills, New Washington, IN (US)

( * ) Notice: Subject to any disclaimer, the term of this patent is extended or adjusted under 35 U.S.C. 154(b) by 5 days.

(21) Appl. No.: 14/859,886

(22) Filed: Sep. 21, 2015

(65) Prior Publication Data
US 2017/0079206 A1 Mar. 23, 2017

(51) Int. Cl.
*A01D 34/73* (2006.01)
*A01D 101/00* (2006.01)

(52) U.S. Cl.
CPC .......... *A01D 34/73* (2013.01); *A01D 2101/00* (2013.01)

(58) Field of Classification Search
CPC ... A01D 34/73; A01D 34/733; A01D 2101/00
USPC ........................................................ 56/295
See application file for complete search history.

(56) References Cited

U.S. PATENT DOCUMENTS

| 2,087,744 | A | * | 7/1937 | Triplett | H01H 85/28 200/34 |
| 2,576,884 | A | * | 11/1951 | Leigh | A01D 34/733 56/17.5 |
| 2,671,681 | A | * | 3/1954 | Wille | B64C 3/00 403/46 |
| 2,869,311 | A | * | 1/1959 | Beeston, Jr. | A01D 34/73 30/345 |
| 2,932,147 | A | * | 4/1960 | Beeston, Jr. | A01D 34/73 15/79.2 |
| 3,321,894 | A | * | 5/1967 | Ingram | A01D 34/63 56/295 |
| 3,327,460 | A | * | 6/1967 | Blackstone | A01D 34/73 56/295 |
| 3,447,291 | A | * | 6/1969 | Guetterman | A01D 34/14 56/295 |
| 3,769,784 | A | * | 11/1973 | Jones | A01D 34/73 56/295 |
| 4,229,933 | A | * | 10/1980 | Bernard | A01D 34/733 56/295 |
| 4,375,148 | A | * | 3/1983 | Beck | A01D 34/733 56/295 |
| 4,471,603 | A | * | 9/1984 | Veltin, Jr. | A01D 34/733 56/17.5 |
| 4,651,510 | A | * | 3/1987 | Malutich | A01D 34/733 56/13.4 |
| D289,524 | S | * | 4/1987 | Andersson | D15/17 |
| 4,779,407 | A | * | 10/1988 | Pattee | A01D 34/73 56/295 |
| 4,922,698 | A | * | 5/1990 | Taylor | A01D 34/733 56/17.5 |
| 5,018,347 | A | * | 5/1991 | Feilen | A01D 34/733 30/335 |
| 5,019,113 | A | | 5/1991 | Burnell | |

(Continued)

*Primary Examiner* — Thomas B Will
*Assistant Examiner* — Joan D Misa

(57) ABSTRACT

A mower blade assembly includes a member that may be rotatably coupled to an output shaft of a lawn mower and the member has a first coupling section and a second coupling section. A pair of blades is provided and each of the blades is removably attached to the member such that each of the blades may cut a lawn. A pair of clips is provided and each of the clips is removably coupled to the member such that each of the clips prevents the blades from being removed from the member.

8 Claims, 3 Drawing Sheets

(56) References Cited

U.S. PATENT DOCUMENTS

| | | | |
|---|---|---|---|
| 5,036,654 A | 8/1991 | Malutich | |
| 5,103,882 A * | 4/1992 | Milbourn | A01G 23/093 144/230 |
| 5,303,535 A * | 4/1994 | Smith | A01D 34/733 56/255 |
| 5,383,329 A | 1/1995 | Cornell, III et al. | |
| 5,467,586 A * | 11/1995 | Lin | A01D 34/73 56/17.5 |
| 5,839,263 A * | 11/1998 | Biernath | A01D 34/73 56/17.5 |
| 6,182,430 B1 | 2/2001 | Blarek et al. | |
| D482,700 S | 11/2003 | Lancaster | |
| 6,935,095 B1 | 8/2005 | Sluder | |
| 8,099,937 B2 | 1/2012 | Lindmeyer | |
| 8,631,550 B2 * | 1/2014 | Janikowski | A01D 34/001 24/460 |
| 8,931,248 B2 * | 1/2015 | Eavenson, Sr. | A01D 34/63 56/17.5 |
| 9,113,594 B1 * | 8/2015 | Delmont | A01D 34/733 |
| 2003/0182918 A1 * | 10/2003 | Stone | A01D 34/73 56/255 |
| 2007/0163124 A1 | 7/2007 | Kenny | |
| 2012/0110970 A1 * | 5/2012 | Blarek | A01D 34/73 56/295 |

\* cited by examiner

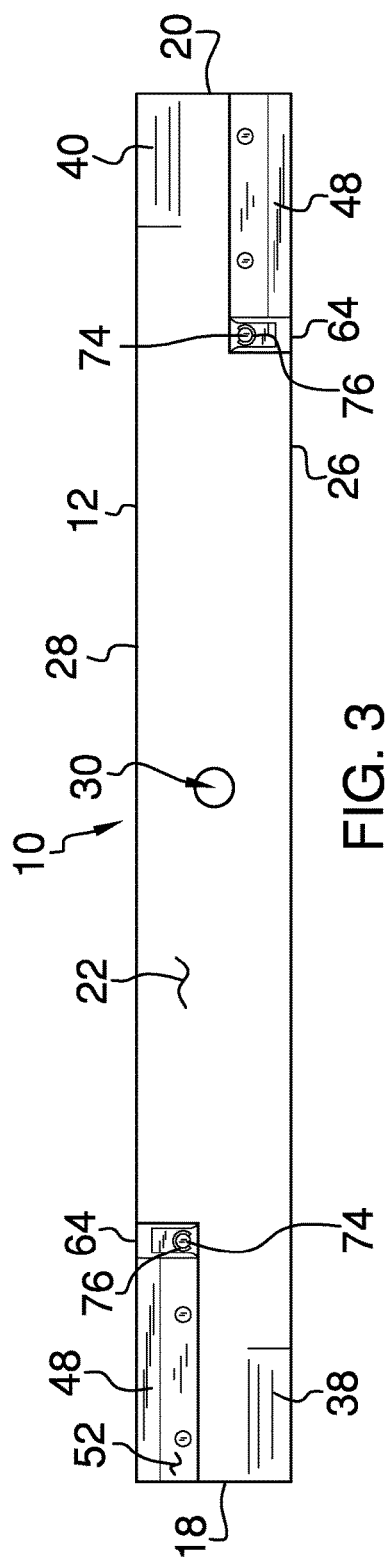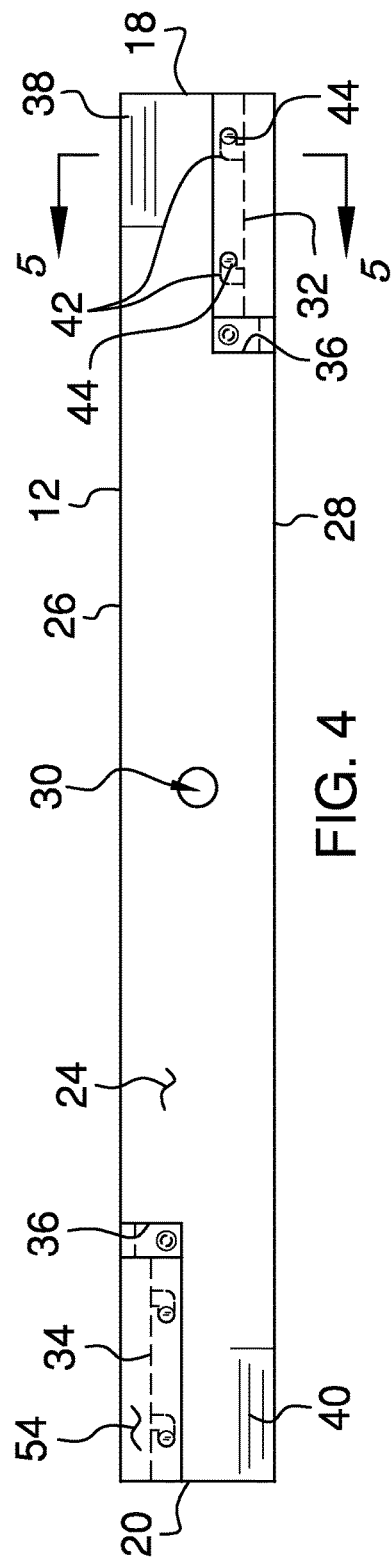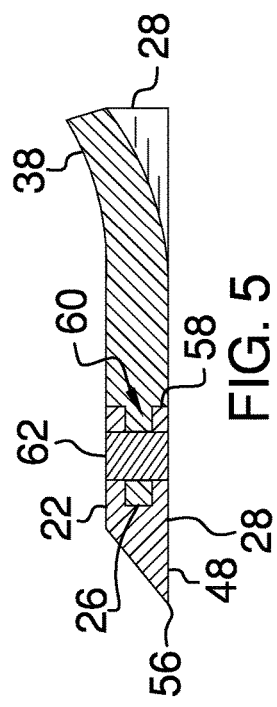

MOWER BLADE ASSEMBLY

BACKGROUND OF THE DISCLOSURE

Field of the Disclosure

The disclosure relates to blade devices and more particularly pertains to a new blade device having a pair of removable cutting edges.

SUMMARY OF THE DISCLOSURE

An embodiment of the disclosure meets the needs presented above by generally comprising a member that may be rotatably coupled to an output shaft of a lawn mower and the member has a first coupling section and a second coupling section. A pair of blades is provided and each of the blades is removably attached to the member such that each of the blades may cut a lawn. A pair of clips is provided and each of the clips is removably coupled to the member such that each of the clips prevents the blades from being removed from the member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a top view of an embodiment of the disclosure.

FIG. 4 is a bottom view of an embodiment of the disclosure.

FIG. 5 is a cross sectional view taken along line 5-5 of FIG. 4 of an embodiment of the disclosure.

DESCRIPTION OF THE PREFERRED EMBODIMENT

Figure 1:
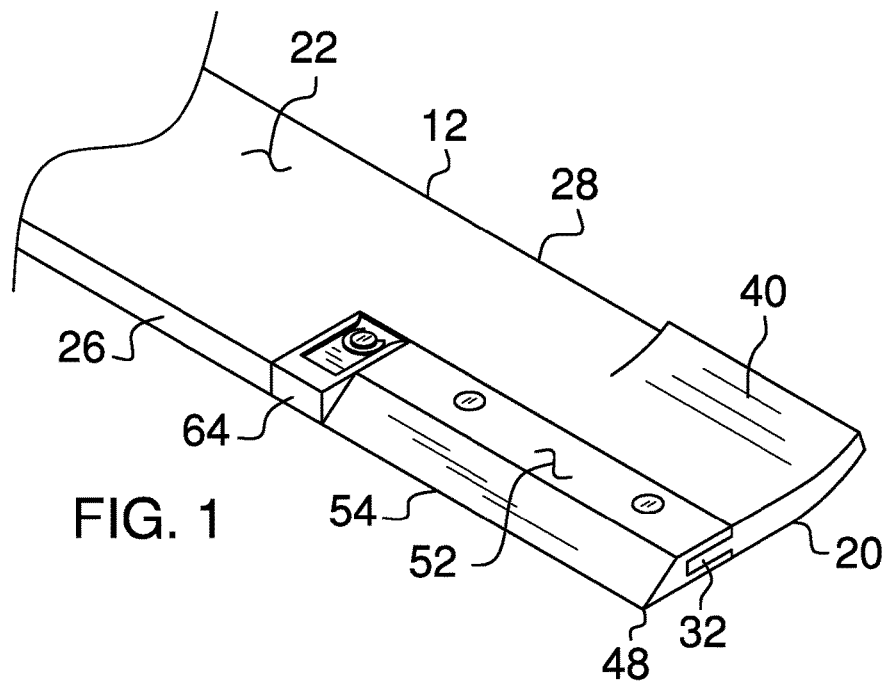
FIG. 1 is a front perspective view of a mower blade assembly according to an embodiment of the disclosure.
Figure 2:
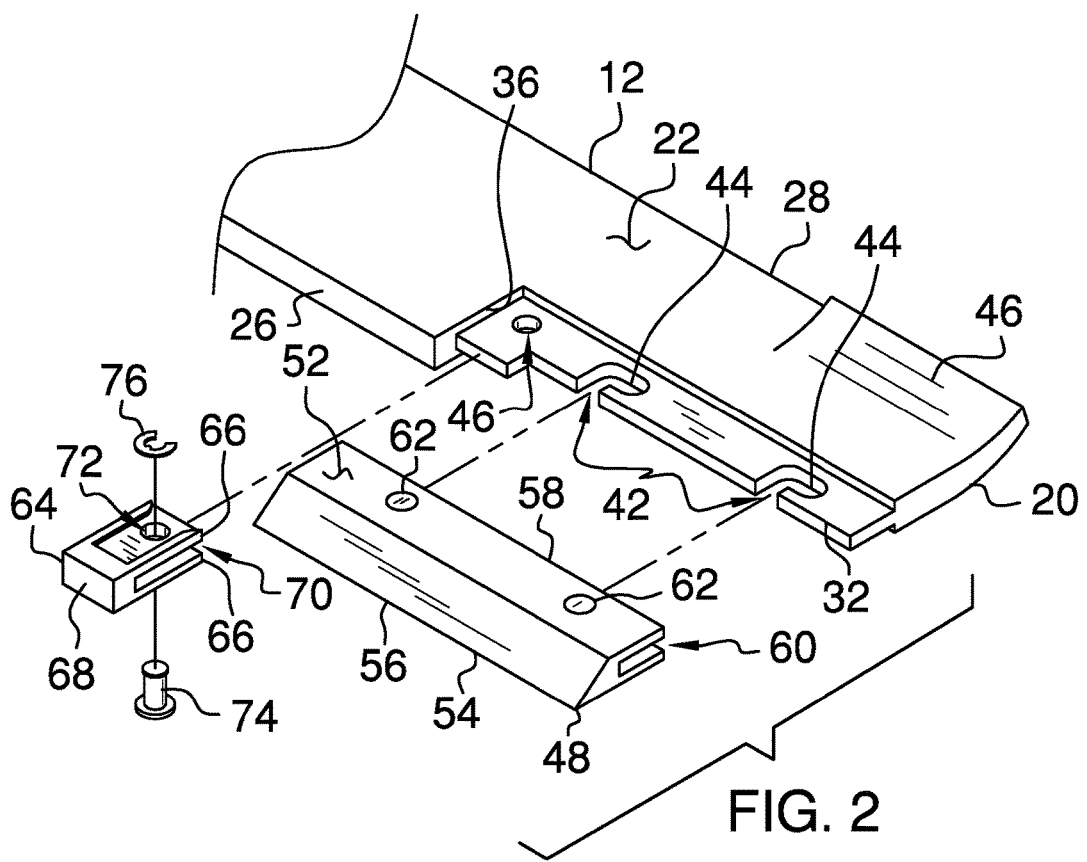
FIG. 2 is an exploded front perspective view of an embodiment of the disclosure.
Figure 6:
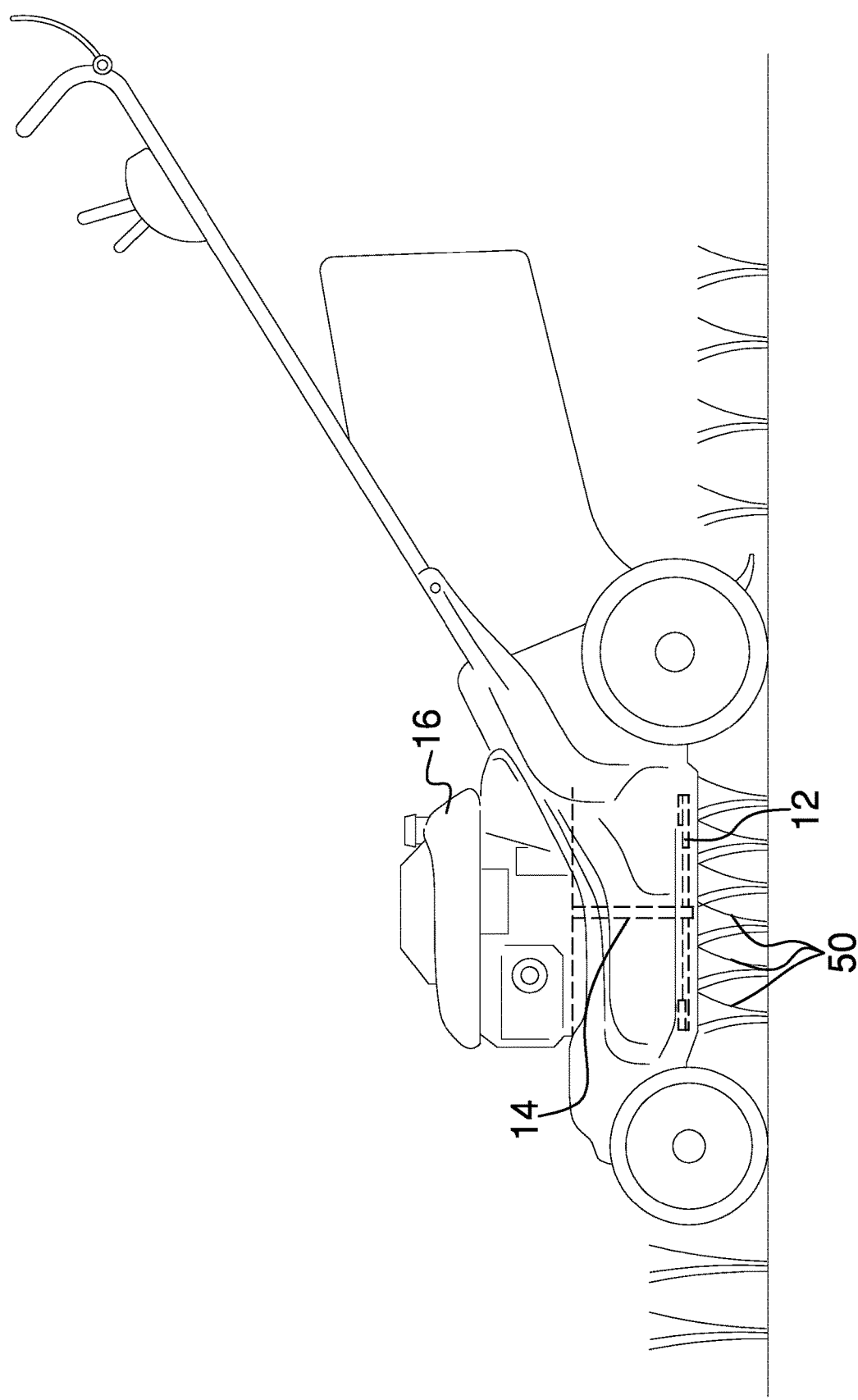
FIG. 6 is a perspective in-use view of an embodiment of the disclosure.

With reference now to the drawings, and in particular to FIGS. 1 through 6 thereof, a new blade device embodying the principles and concepts of an embodiment of the disclosure and generally designated by the reference numeral 10 will be described.

As best illustrated in FIGS. 1 through 6, the mower blade assembly 10 generally comprises a member 12 that may be rotatably coupled to an output shaft 14 of a lawn mower 16. The lawn mower 16 may be a lawn mower of any conventional design. The member 12 has a first end 18, a second end 20, a top surface 22, a bottom surface 24, a front edge 26 and a back edge 28. The member 12 has an aperture 30 extending through the top surface 22 and the bottom surface 24 and the aperture 30 is centrally positioned on the member 12. The aperture 30 insertably receives the output shaft 14.

The member 12 has a first coupling section 32 and a second coupling section 34. The first coupling section 32 extends inwardly from the first end 18 along the front edge 26 and the second coupling section 34 extends inwardly from the second end 20 along the back edge 28. Each of the first coupling section 32 and the second coupling section 34 has a thickness between the top surface 22 and the bottom surface 24 that is less than a thickness of the member 12. Each of the first coupling section 32 and the second coupling section 34 has a longitudinal boundary 36.

The member 12 has a first curved section 38 and a second curved section 40. The first curved section 38 extends inwardly from the first end 18 along the back edge 28 and the second curved section 40 extends inwardly from the second end 20 along the front edge 26. The first curved section 38 curves upwardly with respect to the top surface 22 and the second curved section 40 curves downwardly with respect to the bottom surface 24.

Each of the first coupling section 32 and the second coupling section 34 includes a pair of slots 42 and each of the slots 42 extends through the top surface 22 and the bottom surface 24. The pair of slots 42 on each of the first coupling section 32 and the second coupling section 34 extends inwardly from an associated one of the front edge 26 and the back edge 28. Each of the slots 42 extends outwardly toward an associated one of the first end 18 and the second end 20 and each of the slots 42 has a terminal surface 44. A hole 46 extends through the top surface 22 and the bottom surface 24 and the hole 46 is positioned adjacent to the longitudinal boundary 36.

A pair of blades 48 is provided and each of the blades 48 is removably attached to the member 12. Thus, each of the blades 48 may cut a lawn 50 when the lawn mower 16 rotates the member 12. Each of the blades 48 has an upper surface 52, a lower surface 54, a forward edge 56 and a rearward edge 58. The upper surface 52 tapers downwardly toward the lower surface 54 such that the forward edge 56 defines a point.

A groove 60 extends forwardly in the rearward edge 58 of each of the blades 48 and the groove 60 extends along the rearward edge 58. A pair of posts 62 each extends through the upper surface 52 and the lower surface 54. Each of the posts 62 is positioned in the groove 60 and the posts 62 are spaced apart from each other.

A pair of clips 64 is provided and each of the clips 64 has a pair of arms 66 extending away from a leg 68. The arms 66 are spaced apart from each other to define a space 70 between the arms 66 and each of the clips 64 has an opening 72 extending through each of the arms 66. Each of the clips 64 is positioned to retain the blades 48 on the member 12 having opening 72 in each of the clips 64 being aligned with the hole in the associated first coupling section 32 and the second coupling section 34.

A pair of pins 74 is provided and each of the pins 74 is extended through the opening 72 in an associated one of the clips 64 and an associated one of the holes 46 in the member 12. Thus, each of the pins 74 retains the clips 64 on the member 12. A pair of rings 76 is provided and each of the rings 76 engages one of the pins 74 when the pins 74 are extended through the clips 64 such that each of the rings 76 retains the pins 74 in the clips 64.

In use, each of the blades 48 is positioned such that the groove 60 in each of the blades 48 insertably receives the front edge 26 of an associated one of the first coupling section 32 and the second coupling section 34. Each of the posts 62 on the blades 48 slides into the slots 42 on the associated first coupling section 32 and the second coupling section 34. Each of the blades 48 is slid on the member 12 such that each of the posts 62 on the blades 48 abuts the terminal surface 44 on the associated first coupling section 32 and the second coupling section 34. Thus, each of the blades 48 resists being urged off of the member 12 when the lawn mower 16 rotates the member 12. Each of the clips 64 is positioned such that the space 70 in each of the clips 64 insertably receives the front edge 26 of an associated one of the first coupling section 32 and the second coupling section 34. Each of the clips 64 is positioned between the longitudinal boundary 36 and one of the blades 48 such that each of the clips 64 prevents the blades 48 from being removed from the member 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mower blade assembly having a pair of removable cutting edges, said assembly comprising:
    a member being configured to be rotatably coupled to an output shaft of a lawn mower, said member having a first coupling section and a second coupling section, wherein said member has a first end, a second end, a top surface, a bottom surface, a front edge and a back edge, said member having an aperture extending through said top surface and said bottom surface, said aperture being centrally positioned on said member wherein said aperture is configured to insertably receive the output shaft, wherein each of said first coupling section and said second coupling section includes a pair of slots, each of said slots extending through said top surface and said bottom surface, wherein said pair of slots on each of said first coupling section and said second coupling section extends inwardly from an associated one of said front edge and said back edge and outwardly toward an associated one of said first end and said second end, each of said slots having a terminal surface;
    a pair of blades, each of said blades being removably attached to said member wherein each of said blades is configured to cut a lawn, wherein each of said blades includes
        an upper surface, a lower surface, a forward edge and a rearward edge, said upper surface tapering downwardly toward said lower surface such that said forward edge defines a point, said upper surface including a planar section parallel to said lower surface, said planar section of said upper surface being coplanar with said top surface of said member when said blade is coupled to said member, said lower surface being coplanar with said bottom surface when said blade is coupled to said member,
        a groove extending forwardly in said rearward edge, said groove extending along said rearward edge, and
        a pair of posts, each of said posts extending through said upper surface and said lower surface, each of said posts being positioned in said groove, said posts being spaced apart from each other; and
    a pair of clips, each of said clips being removably coupled to said member such that each of said clips prevents said blades from being removed from said member, wherein each of said clips has a pair of arms extending away from a leg, said arms being spaced apart from each other to define a space between said arms, each of said clips having an opening extending through each of said arms.

2. The assembly according to claim 1, wherein said first coupling section extends inwardly from said first end along said front edge, said second coupling section extending inwardly from said second end along said back edge.

3. The assembly according to claim 1, wherein:
    each of said first coupling section and said second coupling section having a front edge; and
    each of said blades is positioned such that said groove in each of said blades insertably receives said front edge of an associated one of said first coupling section and said second coupling section.

4. The assembly according to claim 3, wherein each of said posts on each of said blades slides into said slots on said associated first coupling section and said second coupling section, each of said blades being slid on said member such that each of said posts on each of said blades abuts said terminal surface on said associated first coupling section and said second coupling section wherein each of said blades is configured to resist being urged off of said member when the lawn mower rotates said member.

5. The assembly according to claim 1, wherein:
    each of said first coupling section and said second coupling section has a front edge, a hole and a longitudinal boundary; and
    each of said clips is positioned such that said space in each of said clips insertably receives said front edge of an associated one of said first coupling section and said second coupling section such that said opening in each of said clips is aligned with said hole in said associated first coupling section and said second coupling section, each of said clips being positioned between said longitudinal boundary and one of said blades.

6. The assembly according to claim 1, further comprising a pair of pins, each of said pins being extended through said opening in an associated one of said clips such that each of said pins retains said clips on said member.

7. The assembly according to claim 6, further comprising a pair of rings, each of said rings engaging one of said pins after said pins are extended through said clips such that each of said rings retains said pins in said clips.

8. A mower blade assembly having a pair of removable cutting edges, said assembly comprising:
    a member being configured to be rotatably coupled to an output shaft of a lawn mower, said member having a first end, a second end, a top surface, a bottom surface, a front edge and a back edge, said member having an aperture extending through said top surface and said bottom surface, said aperture being centrally positioned on said member wherein said aperture is configured to insertably receive the output shaft, said member having a first coupling section and a second coupling section, said first coupling section extending inwardly from said first end along said front edge, said second coupling section extending inwardly from said second end along said back edge, each of said first coupling section and said second coupling section having a thickness between said top surface and said bottom surface being less than a thickness of said member, each of said first coupling section and said second coupling section having a longitudinal boundary, each of said first coupling section and said second coupling section including:

a pair of slots, each of said slots extending through said top surface and said bottom surface, said pair of slots on each of said first coupling section and said second coupling section extending inwardly from an associated one of said front edge and said back edge and outwardly toward an associated one of said first end and said second end, each of said slots having a terminal surface, and a hole extending through said top surface and said bottom surface, said hole being positioned adjacent to said longitudinal boundary;

a pair of blades, each of said blades being removably attached to said member wherein each of said blades is configured to cut a lawn, each of said blades having:

an upper surface, a lower surface, a forward edge and a rearward edge, said upper surface tapering downwardly toward said lower surface such that said forward edge defines a point, said upper surface including a planar section parallel to said lower surface, said planar section of said upper surface being coplanar with said top surface of said member when said blade is coupled to said member, said lower surface being coplanar with said bottom surface when said blade is coupled to said member, a groove extending forwardly in said rearward edge, said groove extending along said rearward edge, and a pair of posts, each of said posts extending through said upper surface and said lower surface, each of said posts being positioned in said groove, said posts being spaced apart from each other;

each of said blades being positioned such that said groove in each of said blades insertably receives said front edge of an associated one of said first coupling section and said second coupling section, each of said posts on each of said blades sliding into said slots on said associated first coupling section and said second coupling section, each of said blades being slid on said member such that each of said posts on each of said blades abuts said terminal surface on said associated first coupling section and said second coupling section wherein each of said blades is configured to resist being urged off of said member when the lawn mower rotates said member;

a pair of clips, each of said clips having a pair of arms extending away from a leg, said arms being spaced apart from each other to define a space between said arms, each of said clips having an opening extending through each of said arms, each of said clips being positioned such that said space in each of said clips insertably receives said front edge of an associated one of said first coupling section and said second coupling section such that said opening in each of said clips is aligned with said hole in said associated first coupling section and said second coupling section, each of said clips being positioned between said longitudinal boundary and one of said blades such that each of said clips prevents said blades from being removed from said member;

a pair of pins, each of said pins being extended through said opening in an associated one of said clips such that each of said pins retains said clips on said member; and a pair of rings, each of said rings engaging one of said pins after said pins are extended through said clips such that each of said rings retains said pins in said clips.

\* \* \* \* \*